United States Patent
Gupta et al.

(10) Patent No.: US 8,796,406 B2
(45) Date of Patent: Aug. 5, 2014

(54) SILOXANE COPOLYMER AND SOLID POLYMER ELECTROLYTE COMPRISING SUCH SILOXANE COPOLYMERS

(75) Inventors: Neeraj Gupta, Bangalore (IN); Anantharaman Dhanabalan, Bangalore (IN); Nagendiran Shanmugam, Karnataka (IN); Vivek Khare, Karnataka (IN)

(73) Assignee: Momentive Performance Materials Inc., Waterford, NY (US)

( * ) Notice: Subject to any disclaimer, the term of this patent is extended or adjusted under 35 U.S.C. 154(b) by 336 days.

(21) Appl. No.: 13/208,864

(22) Filed: Aug. 12, 2011

(65) Prior Publication Data
US 2013/0040207 A1 Feb. 14, 2013

(51) Int. Cl.
*C08F 130/08* (2006.01)
(52) U.S. Cl.
USPC .......................................... 526/279
(58) Field of Classification Search
USPC .......................................... 526/279
See application file for complete search history.

(56) References Cited

U.S. PATENT DOCUMENTS

| | | | | |
|---|---|---|---|---|
| 4,332,731 | A | * | 6/1982 | Endo et al. ............... 549/334 |
| 4,673,718 | A | | 6/1987 | Ryntz et al. |
| 4,906,718 | A | * | 3/1990 | Gornowicz et al. ......... 528/15 |
| 7,138,204 | B2 | | 11/2006 | Akashi et al. |
| 7,378,193 | B2 | | 5/2008 | Kang et al. |
| 2005/0227144 | A1 | | 10/2005 | Akashi et al. |
| 2005/0271948 | A1 | | 12/2005 | Kang et al. |

OTHER PUBLICATIONS
International Search Report for PCT/US2012/049955 dated Oct. 16, 2012.

* cited by examiner

*Primary Examiner* — Kuo-Liang Peng
(74) *Attorney, Agent, or Firm* — Joseph E. Waters, Esq.; MacDonald Hopkins LLC

(57) ABSTRACT

A copolymer suitable for use in forming a solid polymer electrolyte film comprising a first monomer represented by Formula (1):

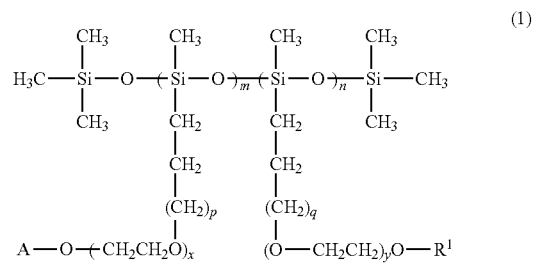

wherein n is 2 to 1,000; m is 2 to 1,000; x and y are individually 1 to 100; p is 0 to 10; and q is 1 to 10, $R^1$ is an alkyl group having 1 to 10 carbon atoms, and A is an alkyl acryloyl group an acryloyl group, alkyl acryloyl group, methacryloyl group, alkyl methacryloyl group, a vinyl group, an allyl group, a styryl group, or a combination of two or more thereof; and a second monomer chosen from a hydroxyl-substituted alkyl acrylate, a hydroxyl-substituted alkyl methacrylate, or a combination of two or more thereof. The copolymer may be used to form a solid polymer electrolyte composition comprising (i) the copolymer, (ii) a plasticizer, and (iii) a salt. The solid polymer electrolyte may be used to form a solid polymer electrolyte film, which may be suitable for use in electrochemical devices.

47 Claims, 1 Drawing Sheet

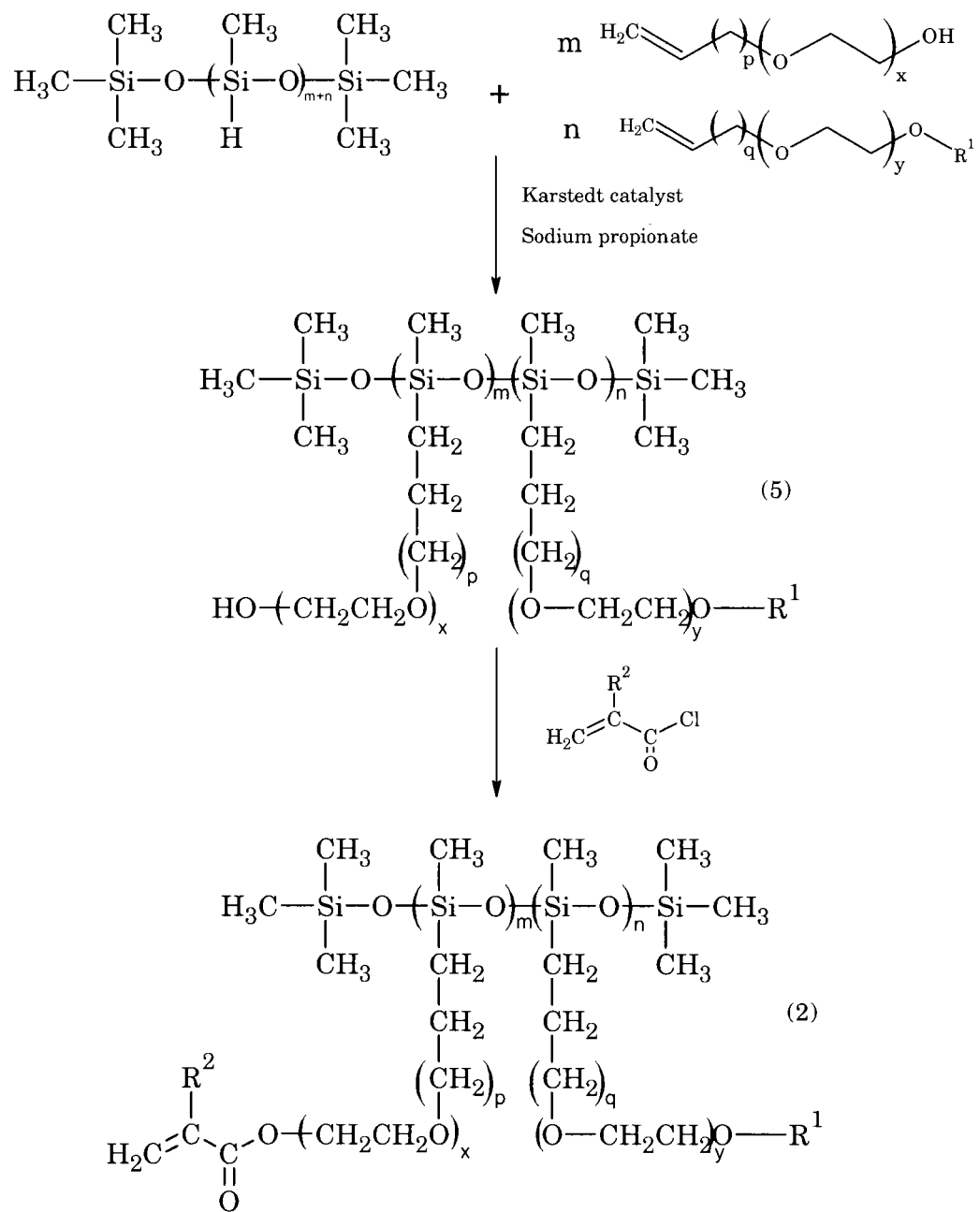

SILOXANE COPOLYMER AND SOLID POLYMER ELECTROLYTE COMPRISING SUCH SILOXANE COPOLYMERS

TECHNICAL FIELD

The present invention provides a cross-linkable silicone polyether, a hydrogel copolymer comprising the silicone polyether, and a solid polymer electrolyte composition comprising the hydrogel copolymer. More particularly, the present invention provides a silicone polyether having a methyl siloxane backbone and alkoxy-terminated polyether and cross-linkable polyether side chains attached to the siloxane backbone. The hydrogel copolymer comprises a cross-linked network of the silicone polyether with a monomer. The solid polymer electrolyte comprises a film formed from the hydrogel copolymer, a plasticizer, and a salt. The solid polymer electrolyte composition has a high ionic conductivity and may be formed into a film suitable for use in electrochemical devices (e.g., lithium ion batteries) of various sizes and for a wide range of applications.

BACKGROUND

Ionically conductive materials are used in a variety of electrochemical devices including primary batteries, secondary batteries, solar capacitors, sensors, electrochemical displays, etc. A common ionically conductive material is an electrolyte employing a mixture of alkyl carbonate based liquids containing a lithium salt. These materials are able to form passive films around the anode and cathode, which enable the battery to function efficiently. A majority of known ionically conductive electrolytes used in lithium ion batteries are liquids which pose problems in battery applications due to leakage. This requires using more expensive metal containers to prevent leakage in addition to raising the cost of manufacturing them. Additionally, such electrolyte materials may also be highly reactive and inflammable, which may pose safety problems particularly if the battery is overcharged to temperatures above 125° C.

Solid electrolyte materials such as polymer electrolytes and gel electrolytes (collectively referred to herein as solid polymer electrolytes or SPEs) have been developed for use as conductive material in battery applications. Solid polymer electrolytes have excellent characteristics including thin film forming properties, flexibility, lightweight, elasticity, and transparency. These materials also do not exhibit the leakage associated with other ionic conductive materials, and may prevent decreases in battery capacity during repeated use and short-circuiting of positive and negative electrode materials. Solid polymer electrolytes may also exhibit high charging/discharging efficiency, which, along with the ability to be formed as films, allows these materials to be used in various types of batteries of different sizes and shapes.

Batteries employing solid polymer electrolyte technology currently use porous poly(vinylidene) fluoride (PVdF) films swollen with organic carbonate solvents. These films, however, may pose flammability hazards and deficiencies due to limited life cycles.

SUMMARY

In one aspect, the present invention provides a novel silicone polyether. In another aspect, the present invention provides a novel hydrogel copolymer comprising such silicone polyethers, and which may be employed in a solid polymer electrolyte composition to provide a solid polymer electrolyte film exhibiting excellent mechanical properties and ionic conductivity. The inventors have found that the silicone polyether provides a material that, through the selection of the side chain functionality and the number of certain functionalized side chains, allows for flexibility in the design of the structure and control over the degree of cross-linking density. The inventors have also found that controlling the degree of cross-linking density allows for control of the mechanical strength and ionic conductivity of the solid polymer electrolyte.

In one aspect, the present invention provides a silicone polyether of the Formula 1 comprising a polymethyl siloxane backbone comprising polyether side chains attached to the siloxane backbones, where the polyether side chains comprise alkoxy-terminated polyether side chains and a cross-linkable polyether side chains:

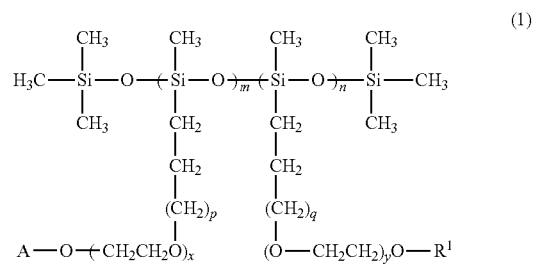

(1)

where m is 2 to 1,000, n is 2 to 1,000, x and y are individually 1 to 100, p is 0 to 10, q is 0 to 10, A is a cross-linkable group (such as from an acryloyl group, an alkyl acryloyl group, a methacryloyl group, alkyl methacryloyl group, a vinyl group, an allyl group, a styryl group, or combinations of two or more thereof), and $R^1$ is an alkyl group having 1 to 10 carbon atoms.

In one aspect, the present invention provides a hydrogel copolymer comprising a first monomer represented by the silicone polyether of Formula 1, and a second monomer chosen from a gel forming monomer. The gel forming monomer may be, for example, a suitable (meth)acrylate material including a hydroxyl-substituted alkyl acrylate, a hydroxyl-substituted alkyl methacrylate, etc. or combinations of two or more thereof.

In one aspect, the present invention provides a solid polymer electrolyte composition comprising (i) a hydrogel copolymer comprising a silicone polyether of Formula 1 and a gel forming monomer, (ii) a plasticizer, and (iii) a salt. The present invention also provides a solid polymer electrolyte film formed from the solid polymer electrolyte composition.

In still another aspect, the present invention provides an electrochemical device comprising a solid polymer electrolyte film formed from a solid polymer electrolyte composition comprising (i) a hydrogel copolymer comprising a silicone polyether represented by Formula 1 and a gel forming monomer, (ii) a plasticizer, and (iii) a salt.

In one aspect, the present invention provides, a copolymer comprising a first monomer of Formula (1)

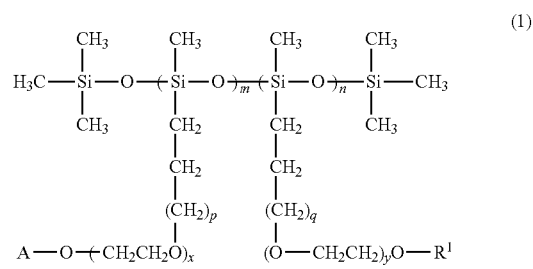

(1)

where n is 2 to 1,000; m is 2 to 1,000; x and y are each at least 1; p is 0 to 10; q is 0 to 10, $R^1$ is an alkyl group having 1 to 10 carbon atoms; and A is an acryloyl group, an alkyl acryloyl group, a methacryloyl group, an alkyl methacryloyl group, a vinyl group, an allyl group, a styryl group, or a combination of two or more thereof; and a second monomer chosen from a gel forming acrylate or methacrylate based monomer.

According to one embodiment, the second monomer is chosen from an alkyl acrylate, an alkyl methacrylate, an alkoxy alkyl acrylate, an alkoxy alkyl methacrylate, a polyester acrylate, a polyester methacrylate, a urethane acrylate, an epoxy acrylate, hydroxyl-substituted alkyl acrylate, a hydroxyl-substituted alkyl methacrylate, or a combination of two or more thereof hydroxyl-substituted alkyl acrylate, a hydroxy-substituted alkyl methacrylate, or a combination of two or more thereof.

According to one embodiment, the copolymer comprises from about 10 to about 90 wt. % of the first monomer and from about 10 to about 90% of the second monomer.

According to one embodiment, the copolymer comprises from about 40 to about 60 wt. % of the first monomer and from about 60 to about 40 wt. % of the second monomer.

According to one embodiment, m is from about 2 to about 30 and n is from about 2 to about 30.

According to one embodiment, comprises m is about 8 to about 20 and n is from about 8 to about 20.

According to one embodiment, m+n is 36.

According to one embodiment, m is from about 25 to about 75% of m+n and n is from about 75 to about 25% of m+n.

According to one embodiment, m is from about 40 to about 60% of m+n and n is from about 60 to about 40% of m+n.

According to one embodiment, m+n is 36, m is 10 to 18, n is 18-26, the first monomer is about 50 to about 90 wt. % of the copolymer, and the second monomer is about 50 to about 10 wt. % of the copolymer.

According to one embodiment, the ratio of m:n is about 1:1 to about 1:11.

According to one embodiment, the first monomer is of the Formula (2):

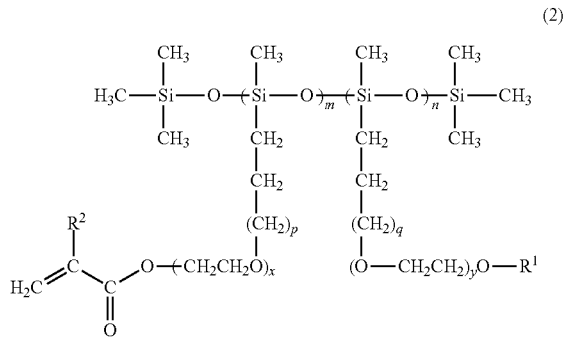

According to one embodiment, A is an alkyl acryloyl, p is 1, and q is 1 such that the first monomer of Formula (1) is represented by Formula (3):

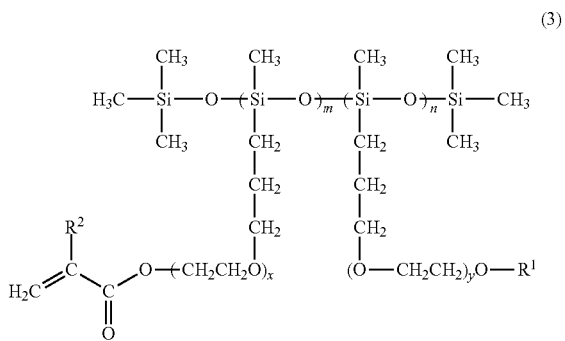

and m+n is 20 to 40, x and y are individually 4 to 20, $R^1$ is an alkyl with 1 to 10 carbon atoms, and $R^2$ is hydrogen or an alkyl of 1 to 10 carbon atoms.

According to one embodiment, the second monomer is hydroxyethyl methacrylate.

According to another aspect, the present invention provides a solid polymer electrolyte composition comprising (i) a copolymer comprising (a) a first monomer represented by Formula (1)

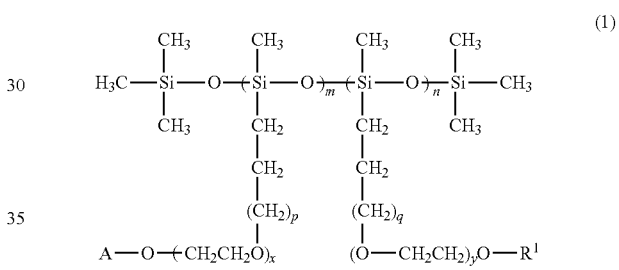

where n is 2 to 1,000; m is 2 to 1,000; x and y are individually 1 to 100; p is 0 to 10; q is 0 to 10; $R^1$ is an alkyl group having 1-10 carbon atoms, and A is an alkyl acryloyl group, an acryloyl group, an alkyl acryloyl group, a methacryloyl group, an alkyl methacryloyl group, a vinyl group, an allyl group, a styryl group, or a combination of two or more thereof; and (b) a second monomer chosen from an alkyl acrylate, an alkyl methacrylate, an alkoxy alkyl acrylate, an alkoxy alkyl methacylate, a polyester acrylate, a polyester methacrylate, a urethane acrylate, an epoxy acrylate, hydroxyl-substituted alkyl acrylate, a hydroxyl-substituted alkyl methacrylate, or a combination of two or more thereof; (ii) a plasticizer; and (iii) a salt.

According to one embodiment, the copolymer (i) comprises from about 10 to about 90 wt. % of the first monomer and from about 10 to about 90% of the second monomer.

According to one embodiment, the copolymer (i) comprises from about 40 to about 60 wt. % of the first monomer and from about 60 to about 40 wt. % of the second monomer.

According to one embodiment, m is from about 2 to about 30 and n is from about 2 to about 30.

According to one embodiment, m is about 8 to about 20 and n is from about 8 to about 20.

According to one embodiment, m+n is about 36.

According to one embodiment, m is from about 25 to about 75% of m+n, and n is from about 75 to about 25% of m+n.

According to one embodiment, m is from about 40 to about 60% of m+n, and n is from about 60 to about 40% of m+n.

According to one embodiment, m+n is 36, m is 10 to 18, n is 18-26, the first monomer is about 50 to about 90 wt. % of the copolymer, and the second monomer is about 50 to about 10 wt. % of the copolymer.

According to one embodiment, A is an alkyl acryloyl, p is 1, and q is 1 such that the first monomer is represented by Formula (3):

$$\text{H}_3\text{C}-\underset{\underset{\text{CH}_3}{|}}{\overset{\overset{\text{CH}_3}{|}}{\text{Si}}}-\text{O}-\underset{\underset{\underset{\underset{\underset{\text{C}=\text{O}}{|}}{\underset{\text{O}-(\text{CH}_2\text{CH}_2\text{O})_x}{|}}}{\underset{\text{CH}_2}{|}}}{\underset{\text{CH}_2}{|}}}{\overset{\overset{\text{CH}_3}{|}}{\text{Si}}}-\text{O})_m-\underset{\underset{\underset{\underset{(\text{O}-\text{CH}_2\text{CH}_2)_y\text{O}-\text{R}^1}{|}}{\underset{\text{CH}_2}{|}}}{\underset{\text{CH}_2}{|}}}{\overset{\overset{\text{CH}_3}{|}}{\text{Si}}}-\text{O})_n-\underset{\underset{\text{CH}_3}{|}}{\overset{\overset{\text{CH}_3}{|}}{\text{Si}}}-\text{CH}_3 \quad (3)$$

and m+n is 20 to 40, x and y are individually 4 to 20, $R^1$ is an alkyl with 1 to 10 carbon atoms, and $R^2$ is hydrogen or an alkyl of 1 to 10 carbon atoms.

According to one embodiment, the second monomer of the copolymer (i) is hydroxy ethyl methacrylate.

According to one embodiment, the copolymer (i) is cross-linked using ethylene glycol dimethacrylate.

According to one embodiment, the copolymer (i) is cured using a photo-initiator (2-hydroxy-2-methylpropiophenone).

According to one embodiment, the plasticizer comprises an alkyl carbonate, a cyclic carbonate, a glyme, a polyalkylene glycol dialkyl ether, or a combination of two or more thereof.

According to one embodiment, the plasticizer comprises an alkyl carbonate chosen from ethylene carbonate, propylene carbonate, butylenes carbonate, dimethyl carbonate, diethyl carbonate, dipropyl carbonate, or a combination of two or more thereof.

According to one embodiment, the plasticizer comprises a mixture of two alkyl carbonates in a ratio of from about 3:1 to about 1:1.

According to one embodiment, the salt is a lithium salt.

According to one embodiment, the composition comprises from about 40 to about 95% by weight of the hydrogel copolymer, and from about 5 to about 60% by weight of plasticizer that comprises about 0.5 to about 20% by weight of the salt.

According to one embodiment, the present invention provides a solid polymer electrolyte film made from such solid polymer electrolyte compositions.

According to one embodiment, the film has an ionic conductivity of about $1.0 \times 10^{-5}$ S-cm$^{-1}$ or greater; about $1.0 \times 10^{-4}$ S-cm$^{-4}$ or greater; or even about $1.0 \times 10^{-3}$ S-cm$^{-1}$ or greater.

According to another aspect, the present invention provides an electrochemical device comprising such solid polymer electrolyte films.

According to still another aspect, the present invention provides, a copolymer comprising a first monomer of Formula (3)

$$\text{H}_3\text{C}-\underset{\underset{\text{CH}_3}{|}}{\overset{\overset{\text{CH}_3}{|}}{\text{Si}}}-\text{O}-\underset{\underset{\underset{\underset{\underset{\text{C}=\text{O}}{|}}{\underset{\text{O}-(\text{CH}_2\text{CH}_2\text{O})_x}{|}}}{\underset{\text{CH}_2}{|}}}{\underset{\text{CH}_2}{|}}}{\overset{\overset{\text{CH}_3}{|}}{\text{Si}}}-\text{O})_m-\underset{\underset{\underset{\underset{(\text{O}-\text{CH}_2\text{CH}_2)_y\text{O}-\text{R}^1}{|}}{\underset{\text{CH}_2}{|}}}{\underset{\text{CH}_2}{|}}}{\overset{\overset{\text{CH}_3}{|}}{\text{Si}}}-\text{O})_n-\underset{\underset{\text{CH}_3}{|}}{\overset{\overset{\text{CH}_3}{|}}{\text{Si}}}-\text{CH}_3 \quad (3)$$

wherein n is 2 to 1,000; m is 2 to 1,000; x and y are individually 1 to 100, $R^1$ is an alkyl group having 1 to 10 carbon atoms, and $R^2$ is hydrogen or an alkyl of 1 to 10 carbon atoms; and a second monomer chosen from a hydroxyl-substituted alkyl acrylate, a hydroxy-substituted alkyl methacrylate, or a combination of two or more thereof.

According to one embodiment, the copolymer comprises from about 10 to about 90 wt. % of the first monomer, and from about 90 to about 10 wt. % of the second monomer.

According to one embodiment, m is from about 25 to about 75% of m+n, and n is from about 75 to about 25% of m+n.

According to one embodiment, R2 is methyl.

According to one embodiment, R1 and R2 are methyl.

According to one embodiment, the copolymer comprises from about 40 to about 60 wt. % of the first monomer and from about 60 to about 40 wt. % of the second monomer, wherein m is 2 to 30 and n is 2 to 30.

According to one embodiment, m+n is 36.

According to one embodiment, the ratio of m:n is about 1:1 to about 1:11.

According to one embodiment, the ratio of m:n is 1:1.

According to one embodiment, the present invention provides a solid polymer electrolyte composition comprising (i) such of the above copolymers; (ii) a plasticizer; and (iii) a salt.

According to one embodiment, the present invention provides films formed from such solid polymer electrolyte compositions.

According to one embodiment, an electrochemical device comprising such films.

These and other aspects of the invention may be further understood with reference to the following figures and detailed description.

BRIEF DESCRIPTION OF THE DRAWINGS

FIG. 1 is a representation of a reaction scheme for forming a silicone polyether in accordance with embodiments of the present invention.

DETAILED DESCRIPTION

The present invention provides a hydrogel copolymer and a solid polymer electrolyte comprising such a hydrogel copolymer. The hydrogel copolymer comprises a copolymer of a silicone polyether and a gel forming monomer such as, for example, a hydroxyl-substituted alkyl acrylate. The hydrogel copolymer and solid polymer electrolyte comprising such copolymers exhibit excellent mechanical strength and ionic conductivity.

In one aspect, the present invention provides a hydrogel copolymer comprising a first monomer of a silicone polyether, and a second monomer chosen from a gel forming monomer. The first monomer is a silicone polyether having a polymethyl siloxane backbone with a plurality of polyether side chains attached to silicon atoms along the siloxane backbone where the polyether side chains include a plurality of alkoxy-terminated polyether side chains and a plurality of side chains comprising a reactive or cross-linkable group. The silicone polyether may be expressed by Formula 1:

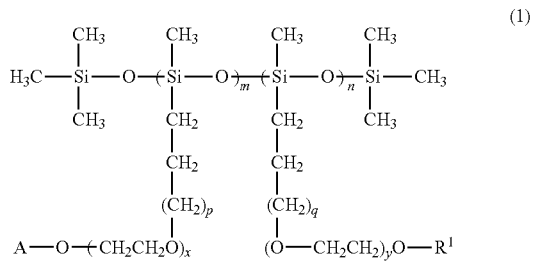

(1)

where m is 2 to 1,000, n is 2 to 1,000, x and y are individually 1 to 100, p is 0 to 10, q is 0 to 10, A is a cross-linkable group, and $R^1$ is an alkyl group having 1 to 10 carbon atoms. The A group may be provided by a suitable group such as an acryloyl group, an alkyl acryloyl group, a methacryloyl group, alkyl methacryloyl group, a vinyl group, an alkyy group, a styryl group, or combinations of two or more thereof, and which, without being bound to any particular theory, may allow the silicone polyether to be cross-linkable with other monomers including the gel forming monomer.

In one embodiment, m is 4 to 500. In another embodiment, m is 6 to 250. In still another embodiment, m is 8 to 100. In yet another embodiment, m is 8 to 20. In one embodiment, n is 4 to 500. In another embodiment, n is 6 to 250. In still another embodiment, n is 8 to 100. In yet another embodiment, n is 8 to 20. In a further embodiment, m is 2 to 30 and n is 2 to 30. In one embodiment m is 8 to 20 and n is 8 to 20. In one embodiment, m+n may be 4 to 2,000. In another embodiment, m+n is 12 to 500. In still another embodiment, m+n is 16 to 200. In yet another embodiment, m+n is 16 to 40. In another embodiment, m+n is 36. Here, as well as elsewhere in the specification and claims, individual numerical values can be combined to form additional and/or non-disclosed ranges.

In one embodiment, the ratio of m:n may be from about 1:1 to about 1:15. In one embodiment, the ratio of m:n may be from about 1:2 to about 1:11. In one embodiment, the ratio of m:n may be about 1:5. In another embodiment, the ratio of m:n is about 1:2.6. Here as elsewhere in the specification and claims, individual numerical values can be combined to form additional and/or non-disclosed ranges.

In the silicone polyether, m may comprise about 25 to about 75% of m+n, and n may comprise about 75% to about 25% of m+n. In one embodiment, m comprises from about 40 to about 60% of m+n, and n comprises from about 60 to about 40% of m+n. In one embodiment, m and n are each 50% of m+n. Here, as well as elsewhere in the specification and claims, individual numerical values can be combined to form additional and/or non-disclosed ranges.

In one embodiment, x and y are each individually 1 to 40. In another embodiment, x and y are each individually 2 to 30. In still another embodiment, x and y are each individually 3 to 25. In yet a further embodiment, x and y are each individually 4 to 20. In still a further embodiment, x and y are each individually 5 to 15. The x and y values may be the same or different. In one embodiment, x and y are each 12. Here, as well as elsewhere in the specification and claims, individual numerical values can be combined to form additional and/or non-disclosed ranges.

The $R^1$ group may be an alkyl group having 1 to 10 carbons. The alkyl group $R^1$ may be a straight chain or branched alkyl group. In one embodiment, $R^1$ is a methyl group.

The A group may be chosen from a group which is reactive to allow for cross-linking with other monomers. In one embodiment, the A group is chosen from an acryloyl group, an alkyl acryloyl group, a methacryloyl group, an alkyl methacryloyl group, a vinyl group, an allyl group, a styryl group, or a combination of two or more thereof. The alkyl group in the alkyl acryloyl group or alkyl methacryloyl group may be an alkyl group having 1 to 10 carbon atoms. In one embodiment the A group is an alkyl acryloyl group chosen from methyl acryloyl, ethyl acryloyl, and combinations of methyl acryloyl and ethyl acryloyl.

In one embodiment, the silicone polyether is of the Formula 2:

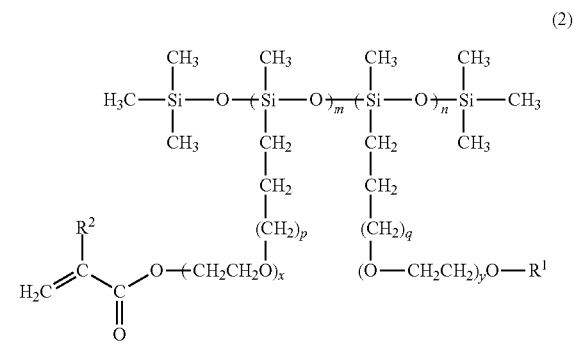

(2)

where m, n, x, y, m+n, the ratio of m:n, p, q, and $R^1$ may have any of the values as previously described herein. $R^2$ may be hydrogen or an alkyl group having 1 to 10 carbons. The $R^2$ group may be a straight chain or branched alkyl group. In one embodiment, the $R^2$ group is a methyl group.

In one embodiment the silicone polyether is of the Formula 3:

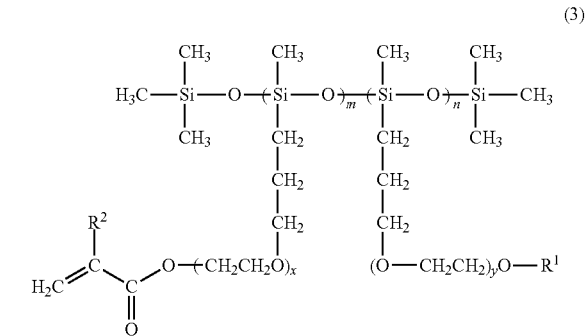

(3)

where m, n, x, y, m+n, the ratio of m:n, $R^1$, and $R^2$ may have any of the values as previously described. Formula 3 represents an embodiment of Formula 2 in which p and q are each 1.

In still another embodiment, the silicone polyether is of the Formula 4:

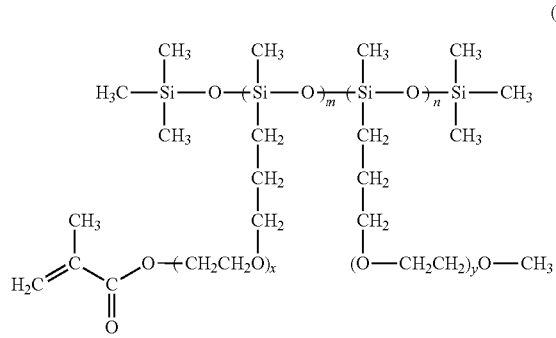

(4)

where m, n, m+n, x, and y may be any value as previously described. In one embodiment, the silicone polyether is represented by Formula (4), and m+n is 36, and the ratio of m:n is from about 1:1 to about 1:15. In another embodiment, m+n is 36, and the ratio of m:n is 1:1. In still another embodiment, m+n is 36, and the ratio of m:n is 1:11. In yet another embodiment, m+n is 36, and the ratio of m:n is 1:2.6. In one embodiment, x and y are 8-15, and x and y may be the same or different. In another embodiment x and y are 12. Here, as well as elsewhere in the specification and claims, individual numerical values can be combined to form additional and/or non-disclosed ranges.

The second monomer in the copolymer is chosen from a gel forming monomer such as an alkyl acrylate, an alkyl methacrylate, an alkoxy alkyl acrylate, an alkoxy alkyl methacylate, a polyester acrylate, a polyester methacrylate, a urethane acrylate, an epoxy acrylate, hydroxyl-substituted alkyl acrylate, a hydroxyl-substituted alkyl methacrylate, or a combination of two or more thereof. In one embodiment, the alkyl groups and alkoxy groups may have 1 to 10 carbon atoms. In one embodiment the alkyl group is chosen from methyl or ethyl. In one embodiment, the second monomer comprises 2-hydroxy ethyl methacrylate (HEMA). In one embodiment, the gel forming monomer may be chosen from 2-hydroxyethyl methacrylate, 2-methoxyethyl methacrylate, polyester acrylate, polyester methacrylate, methyl methacrylate, ethyl methacrylate, isobutyl methacrylate, n-butyl methacrylate, n-butyl methyl methacrylate, hydroxypropyl methacrylate, hydroxyethyl acrylate, glycidyl methacrylate, ethyl acrylate, isobutyl acrylate, n-butyl acrylate, 2-ethylhexyl acrylate polymer, 2-ethylhexyl acrylate copolymer, 2-ethylhexyl acrylate terpolymer, urethane acrylate, epoxy-acrylate, or a combination of two or more thereof.

The hydrogel copolymer may comprise from about 10 to about 90% by weight of the silicone polyether (first monomer) and from about 90 to about 10% by weight of the second (gel forming) monomer. In one embodiment, the copolymer comprises from about 90 to about 30% by weight of the first monomer and from about 10 to about 70% by weight of the second monomer. In still another embodiment, the copolymer comprises from about 60 to about 40% by weight of the first monomer and from about 40 to about 60% by weight of the second monomer. In yet another embodiment, the copolymer comprises about 50% by weight of the first monomer and about 50% by weight of the second monomer. Here, as well as elsewhere in the specification and claims, individual numerical values can be combined to form additional and/or non-disclosed ranges.

The hydrogel copolymer may be formed by cross-linking the first and second monomers in the presence of a cross-linker and a photo-initiator. Non-limiting examples of suitable cross-linkers, include ethylene glycol dimethacrylate, epoxy(meth)acrylate, urethane(meth)acrylate, isocyanuric acid (meth)acrylate, pentaerythritol(meth)acrylate, trimethylolpropane(meth)acrylate, polyester(meth)acrylate, or combinations of two or more thereof.

The present invention also provides a solid polymer electrolyte (SPE) composition comprising a hydrogel copolymer in accordance with the present invention, a plasticizer, and a salt. In one embodiment, the SPE composition comprises from about 40 to about 95% by weight of the hydrogel copolymer, from about 5 to about 60% by weight of plasticizer that comprises from about 0.5 to about 20% by weight of the salt. In another embodiment, the SPE composition comprises from about 10 to about 55% by weight of plasticizer, and from about 1 to about 15% by weight of the lithium salt. In still another embodiment, the SPE composition comprise from about 25 to about 50% by weight of plasticizer, and from about 3 to about 9% by weight of the salt. Here, as well as elsewhere in the specification and claims, individual numerical values can be combined to form additional and/or non-disclosed ranges.

The plasticizer is not particularly limited and may be selected from any suitable material for use in forming an SPE. Suitable plasticizers include, but are not limited to, alkyl carbonates, cyclic carbonates, glymes, polyalkylene glycol dialkyl ethers, and combinations of two or more thereof.

Carbonates suitable as the plasticizer include, but are not limited to, ethylene carbonate (EC), propylene carbonate (PC), butylene carbonate, dimethyl carbonate (DMC), diethyl carbonate, dipropyl carbonate, and the like, and combinations of two or more thereof. In one embodiment, the plasticizer comprises a mixture of carbonates. In one embodiment, the plasticizer comprises a mixture of carbonates in a ratio of from about 3:1 to 1:1. In another embodiment, the plasticizer comprises a mixture of carbonates in a ratio of 2:1. In still another embodiment, the plasticizer comprises a mixture of carbonates in a ratio of 1:1. Here, as well as elsewhere in the specification and claims, individual numerical values can be combined to form additional and/or non-disclosed ranges. In one embodiment, the plasticizer comprises a 1:1 mixture by weight of PC:EC. In one embodiment, the plasticizer comprises a 1:1 mixture by weight of EC:DMC.

Examples of suitable glymes include, but are not limited to, dimethoxyethane ($C_4H_{10}O_2$ or "DME"), diglyme ($C_6H_{14}O_3$), triglyme ($C_8H_{18}O_4$), tetraglyme ($C_{10}H_{22}O_5$), and the like, or a combination of two or more thereof. Examples of suitable polyalkylene glycol dialkyl ethers include, but are not limited to, polyethylene glycol dimethyl ether, polyethylene glycol diethyl ether, polyethylene glycol dipropyl ether, polyethylene glycol dibutyl ether, polyethylene glycol diglycidyl ether, polypropylene glycol dimethyl ether, polypropylene glycol diglycidyl ether, polypropylene glycol/polyethylene glycol copolymer at the end portion of dibutyl ether, polyethylene glycol/polypropylene glycol block copolymer at the end portion of dibutyl ether, and the like, or a combination of two or more thereof. Still other examples of suitable plasticizers include non-aqueous polar solvents such as tetrahydrofuran, 2-methyltetrahydrofuran, 1,3-dioxiran, 4,4-dimethyl-1,3-dioxiran, γ-butyrolactone, and acetonitrile.

In the solid polymer electrolyte composition of the present invention, the salt is not limited to any particular salt and may be chosen for a particular purpose or application. In one embodiment, the salt is a lithium salt. Examples of suitable lithium salts include, but are not limited to, $LiClO_4$, LiCF$_3$SO$_3$, LiBF$_4$, LiPF$_6$, LiAsF$_6$, LiN(SO$_2$C$_2$F$_5$)$_2$, LIBOB (lithium bis oxalato borate), etc., and combinations of two or more thereof. In one embodiment, the lithium salt may be present in a range of from about 2 to about 40 wt. % by weight of the plasticizer. In another embodiment, the salt is present in an amount of from about 5 to about 20 wt. % of the plasticizer. In one embodiment, the salt is present in a concentration of about 0.2 to about 3 M or in another embodiment from about 0.5 to about 1.5 M in the plasticizer. Here, as elsewhere in the specification and claims, individual numerical values can be combined to form additional and/or non-disclosed ranges.

The SPE composition may be used to form a film suitable for use as an SPE. A process for manufacturing a solid polymer electrolyte film including the inventive components is described hereinafter. First, the plasticizer and the lithium salt are charged into a reactor at an appropriate mixing ratio, and the mixture is stirred with a stirrer so as to prepare a solution. A hydrogel copolymer of the present invention is added to the solution, and mixing is then carried out. Next, a curing initiator is added into the mixture, and stirring is carried out to form a reaction mixture for manufacturing the solid polymer electrolyte. This solution is then spread on a supporting substrate which is made of, for example, glass or polyethylene, or on a commercial Mylar film. Then the coated substrate is exposed to electron beams, ultraviolet lights or gamma rays, or heating is carried out, to achieve a curing reaction, thereby forming a film. Another alternative process for obtaining a film is as follows. The inventive solid polymer electrolyte solution is spread on a supporting substrate, and a spacer is fixed to each of the ends of the supporting substrate. Then another supporting member is overlapped on the former substrate. Next, a curing irradiator or a heat source is used to carry out a curing reaction, thereby manufacturing the solid polymer electrolyte film.

The SPE, or a film formed therefrom, may have an ionic conductivity of about $1.0 \times 10^{-5}$ S-cm$^{-1}$ or greater. In one embodiment, the SPE or a film formed therefrom has an ionic conductivity of about $1.0 \times 10^{-1}$ S-cm$^{-1}$ or greater. In still another embodiment the SPE or a film formed therefrom has an ionic conductivity of $1.0 \times 10^{-3}$ S-cm$^{-1}$ or greater. In one embodiment, the SPE or a film formed therefrom has an ionic conductivity of about $1.0 \times 10^{-4}$ S-cm$^{-1}$ to about $1.0 \times 10^{-3}$ S-cm$^{-1}$. Here, as elsewhere in the specification and claims, individual numerical values can be combined to form additional and/or non-disclosed ranges.

The inventors have found that the silicone polyether monomers and hydrogel monomers of the hydrogel copolymer have a synergistic effect providing excellent swelling and mechanical strength such that the swollen/gelled films exhibit high ionic conductivities and excellent mechanical strength.

The solid polymer electrolyte of the present invention provides an enhanced flexibility due to the structural characteristics of the hydrogel copolymer itself and the mechanical properties thereof can be controlled with the ratio of the reactive polyether side chains (the A-group terminated side chains in Formula 1) to the alkoxy terminated side chains, the ratio of silicone polyether monomer to hydrogel monomers, or both. The invention further provides a lithium-polymer secondary battery employing the solid polymer electrolyte with improved mechanical strength and ionic conductivity.

The inventive silicone polyether monomers of formula (1), which are employed in forming the inventive hydrogel copolymers, are formed from a novel silicone polyether having a plurality of hydroxyl-terminated and alkoxy-terminated polyether side chains attached to the silicon atoms of the siloxane backbone, and which may be represented by Formula (5):

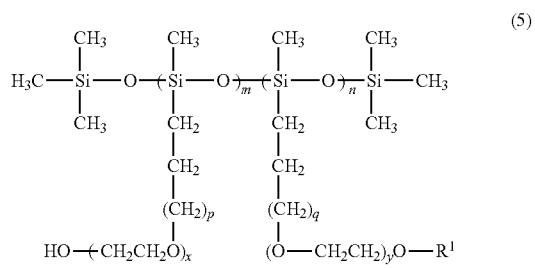

where m, n, m+n, ratio of m:n, x, y, p, q, and R$^1$ may be any value as previously describe herein.

FIG. 1 illustrates a reaction scheme for forming a silicone polyether in accordance with aspects of the present invention. Initially, a polymethyl hydrogen siloxane is reacted with a plurality of hydroxyl-terminated and alkoxy-terminated allyl polyethers, to form a silicone polyether represented by Formula (5). The silicone polyether of Formula (5) having a plurality of alkoxy-terminated and hydroxyl-terminated polyether side chains is then reacted with a suitable compound to provide the desired A group in Formula (1). In FIG. 1, the silicone polyether of Formula (5) is reacted with an (alkyl)acryloyl halide, to esterify the hydroxyl-terminated polyether groups and form the silicone polyether monomer represented by Formula 2. It will be appreciated that the reaction scheme of FIG. 1 is simply an example of forming a silicone polyether in accordance with aspects of the invention and that a method for forming a silicone polyether is not limited to that specific embodiment or to forming a silicone polyether represented by Formula 2. Rather, the reaction scheme may be employed to form a silicone polyether represented by Formula 1 by using an appropriate A group to meet a particular purpose or intended use.

Hydroxyl-terminated groups are highly reactive with lithium salts, and it is desirable for the reaction to be conducted to effect the complete of the hydroxyl groups. The variation in the ratio of alkoxy-terminated to hydroxyl-terminated groups provide a greater degree of flexibility in structure with varying level of cross-linking densities.

An advantage of the SPE composition and films formed from such compositions is the flexibility in tailoring the composition in terms of the cross-linking density. That is, by changing the ratio of the methoxy end capped to the hydroxyl-terminated groups (and subsequently, the A group terminated polyether side chains), one can design a structure that offers good mechanical strength in addition to a workable ionic conductivity for a given degree of gelling with alkyl carbonate electrolytes.

Aspects of the invention may be further understood in view of the following examples. The examples are only for purposes of illustrating embodiments or aspects of the invention, but the invention is not limited to such examples.

EXAMPLES

Preparation of Silicone Polyether

A stoichiometric mixture of 10 g of a polymethyl hydrogen siloxane (MH15 available from Momentive) and 67 g of a methoxy capped polyethylene glycol (APEG 550R available from Clariant) is taken in a round bottom flask and heated to 80° C. using a Heidolph magnetic stirrer/heater. APEG 550R is an allyl polyether containing 12 polyether linkages. The Karstedt catalyst (0.002% Pt) dissolved in 1 ml of toluene was added to the above mixture, followed by the addition of sodium propionate (50 ppm). This was followed by the addition of 33 g of hydroxyl-terminated APEG 550 R (30% stoichiometric excess). The progress of the reaction was monitored via $^1$H NMR analysis for the complete disappearance of the hydride group of the polymethyl hydrogen siloxane. The resulting product is a silicone polyether such as that represented by Formula 5 having a plurality of hydroxyl-terminated and methoxy-terminated polyether side chains where p and q are each 1 and x and y are each 12.

The silicone polyether comprising the hydroxyl-terminated and methoxy-terminated polyether side chains, triethylamine (5.7 g), and methylethyl ketone (MEK) (300 ml) solvent were introduced into a three-neck 1 L RB flask equipped with dropping funnel and a stirring blade. The temperature of the flask was maintained at 0-5° C. by immersing it in an ice bath. With constant stirring, methacryloyl chloride (5.5 ml) dissolved in methylethyl ketone (MEK) (20 ml) was added drop wise into the flask using a dropping funnel. After complete addition of the methacryloyl chloride, stirring was continued at the same temperature for 1 hour and at room temperature for another 2 hours. The triethylamine hydrochloride salt that precipitated out during the reaction was filtered off. 50 ppm of hydroquinone was added to the filtrate and then solvent and other low boiling impurities in the filtrate were removed at lower temperature (40-45° C.) using a rotary vacuum evaporator. The salt that precipitated out again (if any) was filtered off to obtain the final macromer.

An equal weight of a mixture of a 2-hydroxyethyl methacrylate (HEMA) was added to the obtained macromer. Subsequently the mixture was cross-linked by the addition of a cross-linker (ethylene glycol dimethacrylate) and a photo-initiator (2-hydroxy-2-methylpropiophenone). The solution was placed in a mould having dimensions of 5 cm×5 cm×1 mm (thick) or 5 cm×5 cm×0.5 mm (thick) and cured under UV light for 2 hours. After curing, the films were placed in an oven at 80° C. for another 2 hours to obtain the final film.

The resulting silicone polyether has a structure represented by the structure of Formula 4 (with x and y each being 12) having a plurality of alkyl acryloyl- and methoxy-terminated polyether side chains. Different silicone polyethers were formed such that m+n is 36, and where m is 3 and n is 33; m is 10 and n is 26; or m is 18 and n is 18.

The films so formed were then placed in different solution mixtures of LiPF$_6$, ethylene carbonate and dimethyl carbonate to allow them to swell/gel. The percent change of weight due to swelling was measured and ionic conductivities of the resultant swelled polymer gel films were measured.

Table 1 shows the results for various properties of the SPE that were obtained from the silicone polyethers with the different ratio of hydroxyl(acryloyl)-terminated to methoxy-terminated polyether side chains in the structure.

TABLE 1

| Composition | OH:OCH$_3$ | Mechanical Strength | Swelling period, days | Resistance ohm | Initial film thickness, mm | Final film thickness, mm | Ionic Conductivity, S cm$^{-1}$ |
|---|---|---|---|---|---|---|---|
| COPOLYMER + 50% wt HEMA | 10:26 | Medium* | 16 | 540 | 1 | 1.3 | $0.32 \times 10^{-3}$ |
| COPOLYMER + 50% wt HEMA | 10:26 | medium | 21 | 216 | 1 | 1.3 | $0.76 \times 10^{-3}$ |
| COPOLYMER + 50% wt HEMA | 18:18 | High** | 16 | 176 | 1 | 1.4 | $1.00 \times 10^{-3}$ |
| COPOLYMER + 50% wt HEMA | 18:18 | high | 21 | 189 | 1 | 1.4 | $0.94 \times 10^{-3}$ |
| COPOLYMER + 50% wt HEMA | 3:33 | Low*** | 16 | 850 | 1 | 0.9 | $0.13 \times 10^{-3}$ |
| COPOLYMER + 50% wt HEMA | 3:33 | low | 21 | Film broken | 1 | 0.9 | — |

**High - films were intact after conductivity measurement
*Medium - films broke after conductivity measurement
***Low - films changed into powder after conductivity measurement Without being bound to any particular theory, an increase in cross-linking would be expected to increase the film's mechanical strength but decrease the swelling and ionic conductivity of the gelled film. The results in Table 1 indicate, however, that with an increased ratio of hydroxyl- to methoxy-terminated polyether groups i.e. 3:33 to 10:26 to 18:18, which would cause an increase in cross-linking, the ionic conductivity increases from $0.13 \times 10^{-3}$ to $0.32 \times 10^{-3}$ S/cm to $1 \times 10^{-3}$ in 16 days of swelling. For a 21 day experiment, the film with a hydroxyl-terminated to methoxy-terminated side chain ratio of 3:33 (1:11) were found too brittle to do ionic conductivity measurements. The ionic conductivity for 18:18 (1:1) ratio reaches an extremely promising ionic conductivity of $1.2 \times 10^{-3}$ S cm$^{-1}$.

It may also be noted from Table 1 that the relative mechanical strength of the copolymer increases with the degree of cross-linking. In essence both the mechanical strength and the ionic conductivity increase with degree of cross-linking. Without being bound to any particular theory, the presence of the second monomer appears to play a synergistic effect in increasing both the degree of swelling in alkyl carbonate solution and the mechanical strength.

The effect of the second monomer on swelling was also evaluated by preparing copolymers having different loadings of the hydrogel monomer. Solid polymer electrolyte films were prepared with a hydrogel copolymer formed employing (i) a silicone polyether represented by Formula 4 where m is 10, n is 26, and x and y are each 12, and (ii) 10 wt. %, 25 wt. %, or 50 wt. % of the hydrogel monomer HEMA. Table 2 shows that increasing the HEMA concentration in the copolymer causes an increase in the degree of swelling with the 1:1 EC:DMC solution. The swelling increases from 16% to 27% to 38% (by weight) in 6 days with an increase in HEMA from 10% to 25% to 50% (by weight) respectively.

TABLE 2

| Composition | OH:OCH$_3$ | Swelling period, days | Swelling Wt % |
|---|---|---|---|
| Copolymer + 50 wt % HEMA | 10:26 | 3 | 25 |
| Copolymer + 50 wt % HEMA | 10:26 | 6 | 38 |
| Copolymer + 25 wt % HEMA | 10:26 | 3 | 18 |

TABLE 2-continued

| Composition | OH:OCH$_3$ | Swelling period, days | Swelling Wt % |
|---|---|---|---|
| Copolymer + 25 wt % HEMA | 10:26 | 6 | 27 |
| Copolymer + 10 wt % HEMA | 10:26 | 3 | 11 |
| Copolymer + 10 wt % HEMA | 10:26 | 6 | 16 |

Embodiments of the invention have been described above and, obviously, modifications and alterations may occur to others upon the reading and understanding of this specification. The claims as follows are intended to include all modifications and alterations insofar as they come within the scope of the claims or the equivalent thereof.

What is claimed is:

1. A copolymer comprising:
a first monomer of Formula (I)

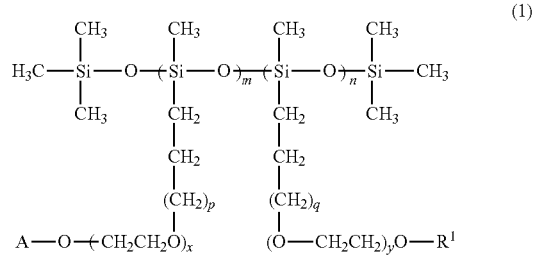

where n is 2 to 1,000; m is 2 to 1,000; x and y are each at least 1; p is 0 to 10; q is 0 to 10, $R^1$ is an alkyl group having 1 to 10 carbon atoms; and A is an acryloyl group, an alkyl acryloyl group, a methacryloyl group, an alkyl methacryloyl group, a vinyl group, an allyl group, a styryl group, or a combination of two or more thereof; and
a second monomer chosen from a hydroxyl-substituted alkyl acrylate, a hydroxyl-substituted alkyl methacrylate, or a combination of two or more thereof.

2. The copolymer of claim 1, comprising from about 10 to about 90 wt. % of the first monomer and from about 90 to about 10% of the second monomer.

3. The copolymer of claim 1, comprising from about 40 to about 60 wt. % of the first monomer and from about 60 to about 40 wt. % of the second monomer.

4. The copolymer of claim 1, wherein m is from about 2 to about 30 and n is from about 2 to about 30.

5. The copolymer of claim 1, wherein m is about 8 to about 20 and n is from about 8 to about 20.

6. The copolymer of claim 1, wherein m+n is 36.

7. The copolymer of claim 1, wherein m is from about 25 to about 75% of m+n, and n is from about 75 to about 25% of m+n.

8. The copolymer of claim 1, wherein m is from about 40 to about 60% of m+n and n is from about 60 to about 40% of m+n.

9. The copolymer of claim 1, wherein m+n is 36, m is 10 to 18, n is 18-26, the first monomer is about 50 to about 90 wt. % of the copolymer, and the second monomer is about 50 to about 10 wt. % of the copolymer.

10. The copolymer of claim 1, where the ratio of m:n is about 1:1 to about 1:11.

11. The copolymer of claim 1, wherein p is 1, and q is 1 such that the first monomer of Formula (1) is represented by Formula (3):

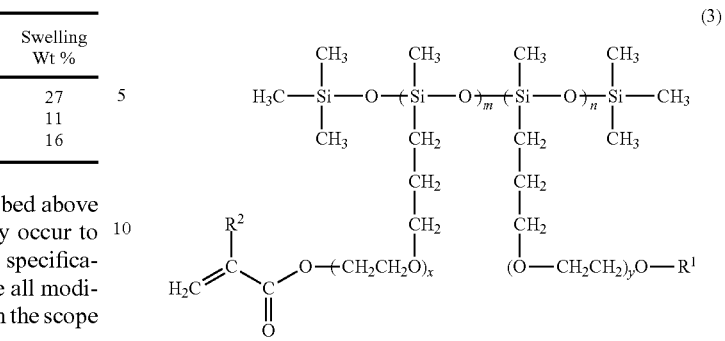

and m+n is 20 to 40, x and y are individually 4 to 20, $R^1$ is an alkyl with 1 to 10 carbon atoms, and $R^2$ is hydrogen or an alkyl of 1 to 10 carbon atoms.

12. The copolymer of claim 1, wherein the second monomer is hydroxyethyl methacrylate.

13. A solid polymer electrolyte composition comprising:
(i) a copolymer comprising (a) a first monomer represented by Formula (1)

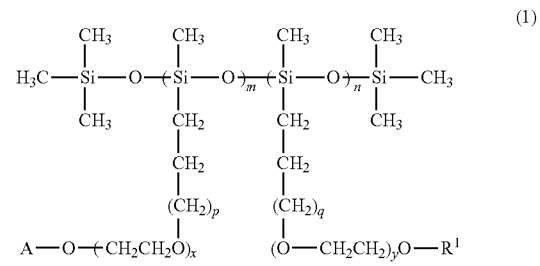

where n is 2 to 1,000; m is 2 to 1,000; x and y are individually 1 to 100; p is 0 to 10; q is 0 to 10; $R^1$ is an alkyl group having 1-10 carbon atoms, and A is an alkyl acryloyl group, an acryloyl group, a methacryloyl group, an alkyl methacryloyl group, a vinyl group, an allyl group, a styryl group, or a combination of two or more thereof; and (b) a second monomer chosen from a hydroxyl-substituted alkyl acrylate, a hydroxyl-substituted alkyl methacrylate, or a combination of two or more thereof;
(ii) a plasticizer; and
(iii) a salt.

14. The composition of claim 13, where the copolymer (i) comprises from about 10 to about 90 wt. % of the first monomer and from about 90 to about 10% of the second monomer.

15. The composition of claim 13, where the copolymer (i) comprises from about 40 to about 60 wt. % of the first monomer and from about 60 to about 40 wt. % of the second monomer.

16. The composition of claim 13, wherein m is from about 2 to about 30 and n is from about 2 to about 30.

17. The composition of claim 13, wherein m is about 8 to about 20 and n is from about 8 to about 20.

18. The composition of claim 13, wherein m+n is about 36.

19. The composition of any of claim 13, wherein m is from about 25 to about 75% of m+n, and n is from about 75 to about 25% of m+n.

20. The composition of claim 13, wherein m is from about 40 to about 60% of m+n, and n is from about 60 to about 40% of m+n.

21. The composition of claim 13, wherein m+n is 36, m is 10 to 18, n is 18-26, the first monomer is about 50 to about 90 wt. % of the copolymer, and the second monomer is about 50 to about 10 wt. % of the copolymer.

22. The composition of claim 13, where p is 1, and q is 1 such that the first monomer is represented by Formula (3):

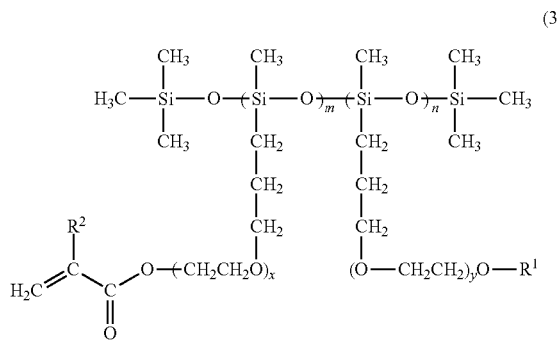

and m+n is 20 to 40, x and y are individually 4 to 20, $R^1$ is an alkyl with 1 to 10 carbon atoms, and $R^2$ is hydrogen or an alkyl of 1 to 10 carbon atoms.

23. The composition of claim 21, wherein the second monomer of the copolymer (i) is 2-hydroxyethyl methacrylate.

24. The composition claim 13, where the solid polymer electrolyte composition further comprises a crosslinking agent comprising ethylene glycol dimethacrylate.

25. The composition of claim 13, where the solid polymer electrolyte composition further comprises a photo-initiator comprising 2-hydroxy-2-methylpropiophenone.

26. The composition of claim 13, wherein the plasticizer comprises an alkyl carbonate, a cyclic carbonate, a glyme, a polyalkylene glycol dialkyl ether, or a combination of two or more thereof.

27. The composition of claim 13, wherein the plasticizer comprises an alkyl carbonate chosen from ethylene carbonate, propylene carbonate, butylenes carbonate, dimethyl carbonate, diethyl carbonate, dipropyl carbonate, or a combination of two or more thereof.

28. The composition of claim 13, where the plasticizer comprises a mixture of two alkyl carbonates in a ratio of from about 3:1 to about 1:1.

29. The composition of claim 13, where the salt is a lithium salt.

30. The composition of claim 13 comprising from about 40 to about 95% by weight of the hydrogel copolymer, and from about 5 to about 60% by weight of plasticizer that comprises from about 0.5 to about 20% by weight of the salt.

31. A solid polymer electrolyte film made from the composition of claim 13.

32. The film of claim 31 having an ionic conductivity of about $1.0 \times 10^{-5}$ S-cm$^{-1}$ or greater.

33. The film of claim 31 having an ionic conductivity of about $1.0 \times 10^{-4}$ S-cm$^{-1}$ or greater.

34. The film of claim 31 having an ionic conductivity of about $1.0 \times 10^{-3}$ S-cm$^{-1}$ or greater.

35. An electrochemical device comprising the film of claim 31.

36. A copolymer comprising:
a first monomer of Formula (3)

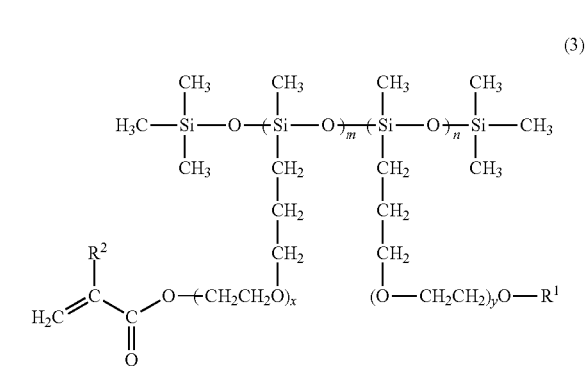

wherein n is 2 to 1,000; m is 2 to 1,000; x and y are individually 1 to 100, $R^1$ is an alkyl group having 1 to 10 carbon atoms, and $R^2$ is hydrogen or an alkyl of 1 to 10 carbon atoms; and
a second monomer chosen from a hydroxyl-substituted alkyl acrylate, a hydroxy-substituted alkyl methacrylate, or a combination of two or more thereof.

37. The copolymer of claim 36, comprising from about 10 to about 90 wt. % of the first monomer, and from about 90 to about 10 wt. % of the second monomer.

38. The copolymer of claim 36, wherein m is from about 25 to about 75% of m+n, and n is from about 75 to about 25% of m+n.

39. The copolymer of claim 36, wherein R2 is methyl.

40. The copolymer of claim 36, where R1 and R2 are methyl.

41. The copolymer of claim 36 comprising from about 40 to about 60 wt. % of the first monomer and from about 60 to about 40 wt. % of the second monomer, wherein m is 2 to 30 and n is 2 to 30.

42. The copolymer of claim 36 where m+n is 36.

43. The copolymer of claim 42, wherein the ratio of m:n is about 1:1 to about 1:11.

44. The copolymer of claim 42, wherein the ratio of m:n is 1:1.

45. A solid polymer electrolyte composition comprising (i) the copolymer of claim 36; (ii) a plasticizer; and (iii) a salt.

46. A film formed from the solid polymer electrolyte composition of claim 45.

47. An electrochemical device comprising the film of claim 46.

* * * * *